T. SANDSTROM.
SHORT TURN GEAR MECHANISM.
APPLICATION FILED SEPT. 20, 1918.
1,313,954.
Patented Aug. 26, 1919.
3 SHEETS—SHEET 1.
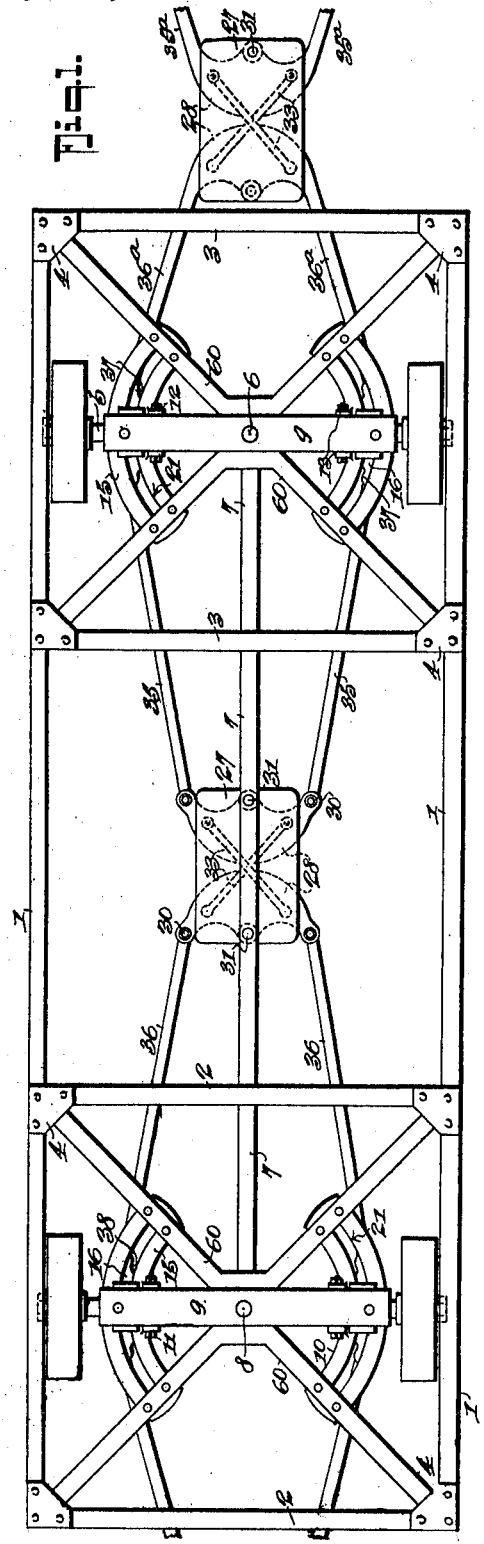
INVENTOR
Theodore Sandstrom
BY
Fred G. Dieterich
ATTORNEYS

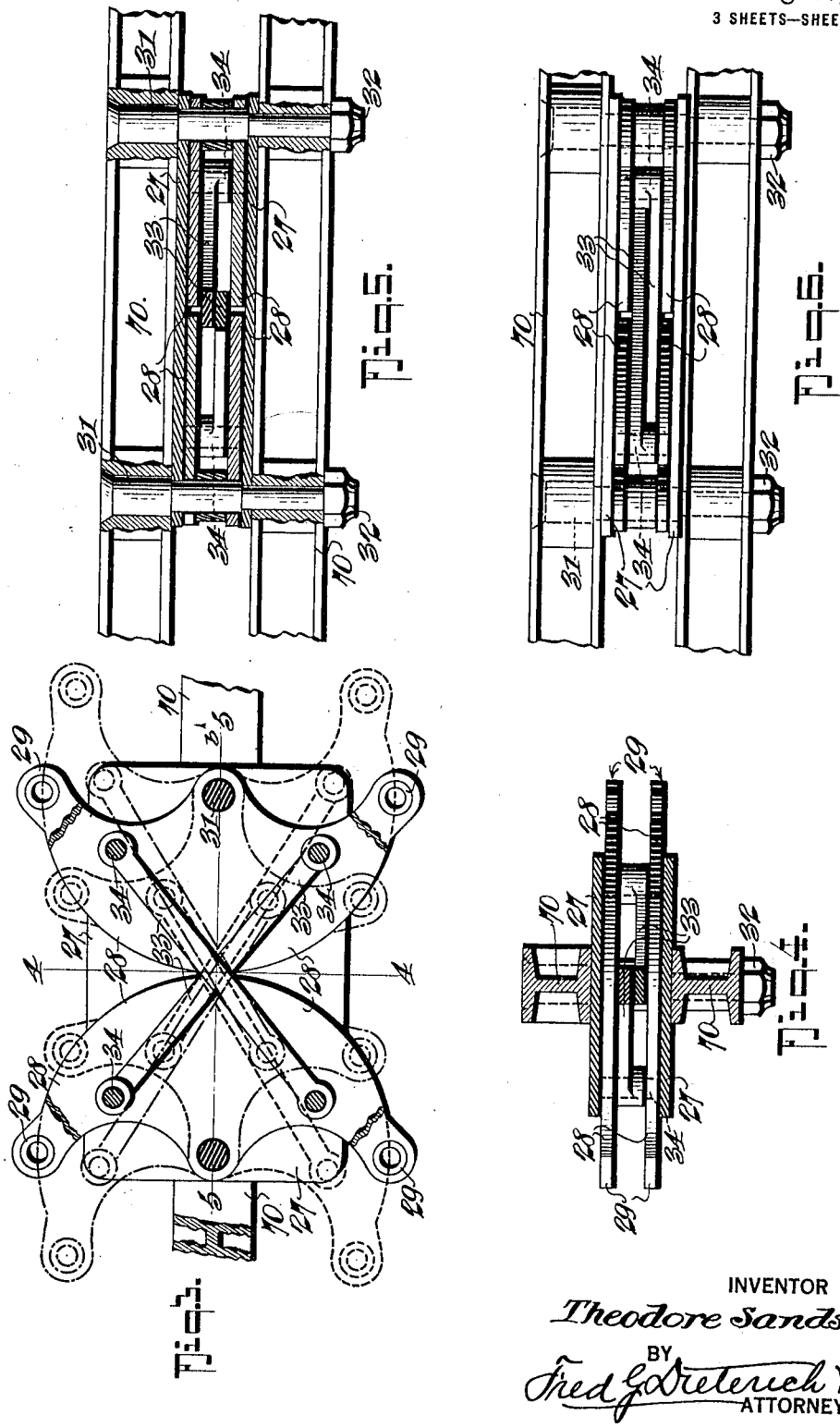

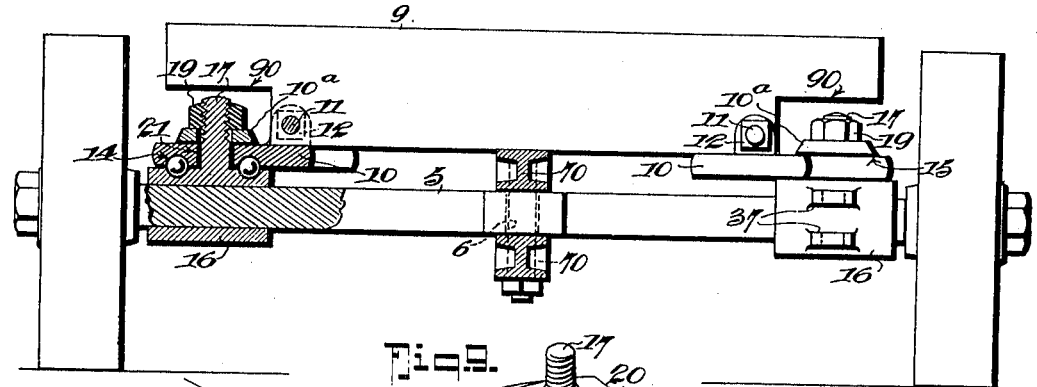
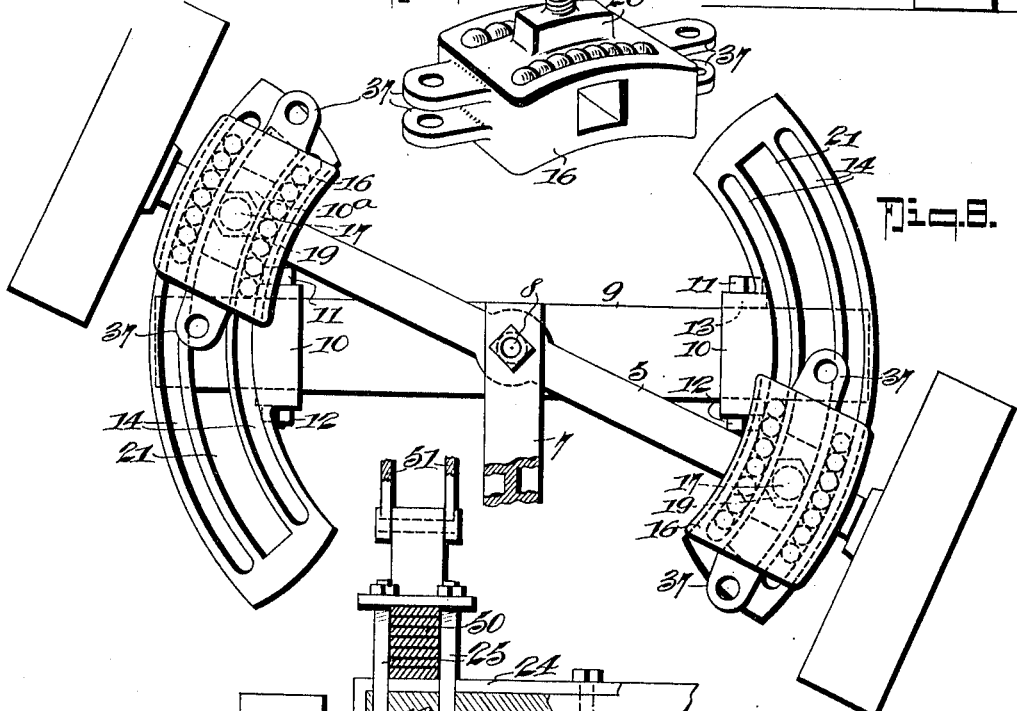
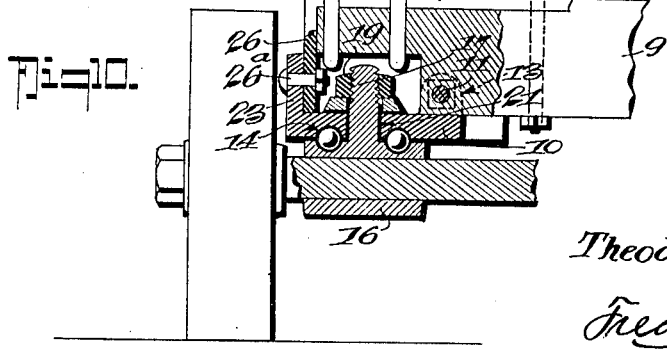

UNITED STATES PATENT OFFICE.

THEODORE SANDSTROM, OF INDIANAPOLIS, INDIANA.

SHORT-TURN-GEAR MECHANISM.

1,313,954.  Specification of Letters Patent.  Patented Aug. 26, 1919.

Application filed September 20, 1918. Serial No. 254,961.

*To all whom it may concern:*

Be it known that I, THEODORE SANDSTROM, a citizen of the United States, residing at Indianapolis, in the county of Marion and State of Indiana, have invented a new and Improved Short-Turn-Gear Mechanism, of which the following is a specification.

This invention has reference to improvements in that class of short turn vehicle gear mechanism, that include horizontally disposed circular or fifth wheel bearings at the front or rear axles and connections that join the front and rear axle bearings for transmitting the desired movements to the rear axle as the front axle is guided in either direction.

Primarily my invention has for its purpose to provide a short turn gear mechanism of the general character stated, of a comparatively simple and inexpensive construction, in which the parts are especially designed for use for ware-house truck trailers and for transmitting the strain from one axle to the other, in a positive, direct and uniform manner.

Another object of my invention is to provide, in an improved short turn gear construction, a peculiar "cross-over" connection for joining the front and rear axles and adapted for connecting the back axle of a vehicle trailer with the front axle of a following trailer when hooked in tandem and in such manner that the several trailers will track.

Again, my invention embodies an improved construction of the front and back horizontal or fifth wheel mechanisms of a short turn gear, in which is included means for rigidly bracing the said mechanism with the trailer frame and for holding the axles in proper alinement with the "cross-over" or coupling devices that connect the said front and back axles in such a manner whereby to provide for a free and easy operation of the parts when transmitting the desired movement from one axle to another.

With other objects in view, all of which will hereinafter appear, my invention consists in the peculiar construction and novel combination of parts all of which will be first explained in the following detailed description, specifically stated in the claims and illustrated in the accompanying drawings in which:

Figure 1 is a plan view of a ware-house trailer frame equipped with my improved construction of short turn gear mechanism, the parts being shown at the "straight ahead" position, a "cross-over" or coupling means being also shown attached to the front axle to illustrate the application of the said means for hooking up with another trailer.

Fig. 2 is a diagrammatic plan view that illustrates the relative position of the parts that constitute one of the "cross-overs" or coupling means when making a turn.

Fig. 3 is a plan view, parts being in horizontal section, of the "cross-over" or short turn coupling means, the parts being illustrated at the normal or "straight ahead" position in full lines, and at a "short turn" position in dotted lines.

Fig. 4 is a transverse section thereof taken on the line 4—4 of Fig. 3, looking in the direction of the arrow.

Fig. 5 is a longitudinal section thereof taken practically on the line 5—5 of Fig. 3, looking in the direction of arrow *b*.

Fig. 6 is a side elevation of the parts shown in Fig. 3, and illustrates the manner of securing the short turn coupling means to the upper and lower reach bars.

Fig. 7 is a front view of the front axle of a ware-house trailer, the bolster, and the fifth wheel mechanism, parts being in section.

Fig. 8 is an inverted plan view of the parts shown in Fig. 7.

Fig. 9 is a perspective view of one of the coupling blocks of which there is one attached to each axle end.

Fig. 10 is a longitudinal section of one end of one of the axles with its coupling block and the bolster connections, the latter being especially adapted for heavy trailers.

In my present construction of short turn gear for vehicles, the means used for transferring or effecting a "cross-over" of the draft strain from an advancing truck axle and another truck axle following, which may be the front and rear axles of a vehicle, or a rear axle and a front axle of a pair of truck trailers traveling in tandem, is especially adapted for use in connection with fifth wheel bearing mechanisms coöperating with their front and rear axles, the said bearing mechanisms and the "cross-over" means being so combined and connected with the frame of the trailer or other vehicle body whereby a practically rigid mounting of the said "cross-over" means and their connections with the front and rear axles are maintained under all conditions under which the truck may be running.

In the practical application of my present construction of short turn gear mechanism, the trailer or other vehicle body supporting frame comprises opposite side channel beams 1—1 connected at the ends by cross beams 2—2 and 3—3, the latter constituting a part of the front and the rear truck frame or fifth wheel bearing structures, to be presently explained. At the several corners, the side beams 1—1 and the cross beams 2—2 and 3—3 are joined by angle or cap plates 4—4, as shown.

As the fifth wheel or bearing structures for the front and rear axles are alike a detailed description of but one of such structures is given.

Referring now to Fig. 7, 5 designates the front axle that is pivotally mounted on a king bolt 6 which takes through the front ends of the upper and lower I-beams 70—70 that constitute the reach member 7 and whose other or rear ends are likewise connected to the rear axle king bolt 8, as shown in Fig. 1.

9 designates the front bolster and it is rigidly mounted upon the front end of the reach member 7.

The opposite ends of the bolster are undercut as at 90 and to each of the said ends is secured a casting 10, the latter being attached to their respective bolster ends by bolts and nuts 11—12 that take through apertured ears 13 that constitute parts of the said castings 10—10.

Each casting 10 includes a segmental horizontal bearing plate 15 that is curved concentric with the king bolt and whose lower face is formed with one or more ball races 14—14, as shown.

A coupling block 16 is attached, in any suitable manner, to each end of the axle and each of said blocks has an upwardly extending stud 17 and the said studs 17—17 pass through apertured retaining plates 10ª—10ª, their upper ends being threaded for receiving the lock nuts 19—19 thereon, as is fully illustrated in Fig. 7 of the drawings. Each coupling block includes a curved guide flange 20 on the upper side thereof, and the said flanges 20—20, when the parts are operatively connected, ride in the segmental slots 21—21 formed in the bearing plates 15 (see Fig. 9) and serve to steady the connection of the coupling blocks with the bearing plates.

The construction of the truck, as in Fig. 1, is such that I find it especially well adapted for ware-house trailers.

For heavy trailers I prefer to use the modified means for connecting the ends of the bolster with the axle, as shown in Fig. 10, by reference to which it will be noticed that the casting 10 is formed with a vertical flange 23 to provide for conveniently bolting thereon one end of a reinforced angled bearing plate 24 that seats on top of the outer end of the bolster, is secured at its inner end to the bolster by a clamp bolt 25 and by the pendent or angle portion 26 which extends down over the outer end of the bolster and is secured to the flange 23 of the member 10 by a bolt and nut connection 26ª.

As before stated, in my present construction of short turn gear mechanism, the "cross-over" connections between the two axles, by which the draft strain from a forward axle is transmitted to a rear axle, is especially adapted for use in connection with the particular form of bearing members for the axle, as shown in the drawings and heretofore described.

The coupling means that connect with the two axles, when it is to be used between the front and rear axles, as shown in Fig. 1, consist of a pair of flat rectangular shaped plates 27—27 between which is sustained two sets of upper and lower semi-circular plates 28—28, the opposite ends of each of which, when the said coupling device is to be used between a front and rear axle, terminate in an apertured extension 29—29 adapted for receiving a coupling screw pin 30—30, the purpose of which will presently appear.

The "cross-over connections" are located midway between the two axles and are mounted between the upper and the lower bars that constitute the reach members 70 and the said connections are secured by a pair of screw bolts 31—31 and lock nuts 32—32, as best shown in Fig. 5, by reference to which it will be also seen that the said connections include a pair of "cross-over" links 33 whose opposite ends are fulcrumed on the pivot pins 34—34 that join the upper and lower ones of their respective sets of circular shaped plates 28.

35—35 designate a pair of front connecting rods and 36—36 a like pair of rear connecting rods, the latter being pivotally connected at their front ends to the stud pins 30—30 at the opposite ends of the rear set of plates 28. The front rods 35—35 are likewise connected to the stud pins 30—30 on the opposite ends of the front plates 28—28 (see Fig. 1). The front ends of the front rods connect with the bifurcated apertured ears 37—37 on the rear end of the coupling blocks 16—16 on the front axle, and the rear connecting rods 36—36 connect to the bifurcated apertured ears 38—38 on the front end of the blocks 16—16 mounted on the rear axle.

When using my construction of "cross-over" or coupling devices, for hooking up a pair of trailers, to run in tandem, the plates 28—28 and their respective connecting rods 35ᵃ—35ᵃ and 36ᵃ—36ᵃ, are preferably integrally formed, as clearly shown on Fig. 1, it being understood that when used for connecting two trailers the rearwardly extending connecting rods pivotally join with the bifurcated bearings on the front of the coupling blocks on the front axle of the rear trailer, and the front rods 35ᵃ—35ᵃ likewise connect to the coupling blocks on the rear axle of a front trailer, not shown.

50 designates one of the spring bearings that are secured to the bolster, by clips 51 when the modified arrangement shown is used for heavy trailers and when the spring equipped frame is used it is understood that the trailer body is hung on the springs 50 in the usual manner.

From the foregoing description taken in connection with the accompanying drawings, the complete construction, the manner of using, and the advantages of my present form of short turn gear mechanism will be readily understood by those skilled in the art to which said invention relates.

By providing a coupling means for connecting a pair of axles, in the manner stated and shown, which coupling means includes a pair of horizontally oscillatable members, one for each axle, and in turn connected by crossed links, and supporting the said coupling means in the horizontal plane of the said axles, a positively operating mechanism is provided for transmitting lateral motion of a forward axle to an axle to the rear thereof.

Furthermore the coöperating parts maintain, at all times, and under all conditions of road surface, a relatively rigid relation and in a manner that lateral or torsional strain of the transmitting means is practically eliminated.

Again the correlation of the fifth wheel or horizontal bearing members on the axle and the coupling devices that join the two axles are such that the said coupling devices are used for hooking up a pair of trailers to run in tandem and work in harmony with the coupling devices utilized between the front and rear axles of the trailer.

The slotted segmental members that constitute the horizontal bearings, over which the ends of the axles move, and the coupling or pull blocks with the vertical ribs that guide in the slots of the segmental members aid in holding the axles, the plates 28—28 of the coupling devices and the link rods that connect the plates of the said coupling devices or "cross-over" and the coupling blocks, in perfect horizontal alinement, the ball bearings materially helping or causing a free and easy movement of the several parts while making the turn.

To aid in maintaining the parts in a relatively rigid horizontal alinement, the segmental bearing members engaged by the coupling blocks on the front and rear axles are sustained in rigid condition by triangular shaped braces 60 that are connected with the opposite ends of the reach bar in any suitable manner and with the corners formed by the opposite side and cross bars of the main frame, as is clearly shown in Fig. 1.

What I claim is:

1. In a short turn gear mechanism, the combination with a pair of wheeled axles, a coupling means located between the said axles, the said coupling means including a pair of horizontally oscillatable plates, links connecting the opposite ends of one axle to the like ends of one of the said plates, links connecting the opposite ends of the other axles and the corresponding ends of the other of said plates, and "cross-over" links connecting the two plates.

2. In a short turn gear mechanism for trailers, in combination, a frame including a reach composed of upper and lower parallel members, front and rear axles mounted between the reach members to swing in the horizontal plane, a bolster mounted on the reach in line with the axle, a casting on each end of the bolster, each of which includes a segmental horizontal bearing member, a coupling block on each end of the axles, the said blocks being held to travel against their respective segmental bearing members, and connections joining the opposite ends of the front and rear axles, the said connections including automatically shiftable "cross-over" devices whereby to reverse the direction of lateral movement transmitted from one axle to the other.

3. In a short turn gear mechanism, a frame which includes a reach bar, front and rear axles upon which the frame is mounted, the said frame including a bolster for each axle, a king bolt connection between each axle and its bolster, the said frame also including side and cross bars, a horizontal bearing member on each end of each bolster with which the axles engage, coupling means including "cross-over" link devices connecting the opposite ends of the front and back axles, other means for bracing the horizontal bearing plates on the bolsters, the said means including triangular shaped bars that connect at the ends to the side and cross members of the main frame and with the opposite sides of the bolster.

4. In a short turn gear mechanism of the character described, a "cross-over" connection between two axles adapted for effecting movement to the axles in reverse directions, the said "cross-over" connections including a pair of oppositely disposed plates disposed in a horizontal plane, crossed link rods pivotally connecting the said plates and connecting rods that join the opposite ends of each of the pair of horizontally disposed plates and their coincident ends of the front and rear axles.

5. In a short turn gear mechanism of the character described, a truck body supporting frame, a wheeled axle at each end of the main frame, a reach bar, a bolster on each end of the reach bar, a king pin connecting each axle, its bolster and the corresponding ends of the reach bar, a bearing plate carried on each end of each bolster, each of the said plates having a segmental guide slot, a coupling block on each end of each axle, the said blocks each having a rib flange adapted for engaging the segmental guide slots in the bearing plates and means between the front and rear axles connected to the blocks on the front and rear axles and including a "cross-over" device adapted for effecting a reverse movement of the rear axle as the other axle turns.

6. In a short turn gear mechanism of the character stated, the combination with a body supporting frame that includes opposite side bars and opposite end bars, a wheeled axle for each end of the frame, a bolster for each axle, a reach bar, a king bolt connection that joins each axle and its bolster and the corresponding end of the reach bar, a casting on each end of each bolster, each of the said castings including a longitudinally slotted segmental bearing member, bracing members for holding the said bearing members in rigid relation with the reach bar, a coupling block on each end of each axle, the said blocks having guide ribs for engaging the slots in their respective bearing members for guiding the said coupling blocks and means including a "cross-over" device connecting the opposite ends of the front and rear axles for effecting a reverse movement of the rear axle as the front axle is turned.

7. In a short turn gear mechanism of the character described, the combination with a pair of axle members, a reach bar connecting said members, a bolster for each axle, a king bolt connecting each bolster, its respective axle and reach bar end, a casting secured to each end of each bolster, each of the said castings including a horizontal segmental bearing having a slot concentric with the king bolt, a body supporting spring attached to each end of each bolster, a coupling block on each end of each axle, means for holding the blocks in contact with their respective segmental bearings, the said means including a rib on the blocks movable in the segmental slots and a bolt and nut connection.

8. In a short turn gear mechanism of the character described, the combination with a pair of axle members, a reach bar connecting said members, a bolster for each axle, a king bolt connecting each bolster, its respective axle and reach bar end, a casting secured to each end of each bolster, each of the said castings including a horizontal segmental bearing having a slot concentric with the king bolt, a body supporting spring attached to each end of each bolster, a coupling block on each end of each axle, means for holding the blocks in contact with their respective segmental bearings, the said means including a rib on the blocks movable in the segmental slots, a bolt and nut connection, the opposing faces of the segmental bearing members and the blocks having ball races to receive ball bearings, and flexible means connecting the coupling blocks of one axle with the coupling blocks on the other axle, the said means including "cross-over" connections whereby to impart motion in reverse directions from one axle to another.

9. In a short turn gear mechanism of the character described, the combination with a pair of axle members, a reach bar connecting said members, a bolster for each axle, a king bolt connecting each bolster, its respective axle and reach bar end, a casting secured to each end of each bolster, each of the said castings including a horizontal segmental bearing having a slot concentric with the king bolt, a body supporting spring attached to each end of each bolster, a coupling block on each end of each axle, means for holding the blocks in contact with their respective segmental bearings, the said means including a rib on the blocks movable in the segmental slots, a bolt and nut connection, the opposing faces of the segmental bearing members and the blocks having ball races to receive ball bearings, flexible means connecting the coupling blocks of one axle with the coupling blocks on the other axle, the said means including "cross-over" connections whereby to impart motion in reverse directions from one axle to another, and means for bracing the segmental members, the said means comprising triangular shaped bars fixedly secured to the outer extremities of the segmental members to the brace bar and the side and cross members of the main frame.

10. An axle structure for short turn gear mechanisms in which is included "cross-over" connections that join the front and rear axles; the said structure comprising in combination with a reach bar, a bolster mounted on the end of the said bar and a horizontally disposed segmentally slotted bearing member fixedly attached to each end of the bolster; of a coupling block mounted on each end of the axle, the said coupling blocks each having apertured members at the front and rear ends for receiving the ends of the "cross-over" connections, a segmental rib flange for engaging the slots in their respective bearing members and bolt and nut devices for holding the said coupling devices in a relatively clamped connection with their respective slotted bearing members.

11. In a short turn gear mechanism of the type having "cross-over" connections for joining the opposite ends of the front and rear axles and a reach bar; a "cross-over" connection comprising an upper and a lower plate, a pair of opposing horizontally disposed oscillatable members, bolts that take through the reach bar, the upper and lower plates and constitute the pivots for the oscillatable members, and "cross-over" links pivotally connected at their ends to the said oppositely horizontally disposed oscillatable members, the latter having provision at their opposite laterally projected ends for connection with the front and rear axles.

12. In a short turn gear mechanism, a fifth wheel structure comprising in combination with a vehicle body supporting frame including a bolster; of a pair of wheeled axles each having a king bolt connection that joins the said axles with their bolsters, the bolsters each having a horizontal bearing casting at each end, each of said castings having a guide slot concentric with the king bolt, a coupling block attached to each end of the axles, and movable over the said slotted bearing castings, each of the coupling blocks having a portion that projects within the slot of their respective bearing castings, and means pivotally connecting the coupling blocks of one axle with the coupling blocks on the other axle for the purposes described.

THEODORE SANDSTROM.

Copies of this patent may be obtained for five cents each, by addressing the "Commissioner of Patents, Washington, D. C."